April 3, 1956  R. W. SWIGART ET AL  2,740,604
PRESSURE SENSITIVE FLOW REGULATOR
Filed Dec. 9, 1952  2 Sheets-Sheet 1

INVENTORS:—
Robert W. Swigart
Fredrick N. Sill

By Herbert E. Metcalf
Their Patent Attorney

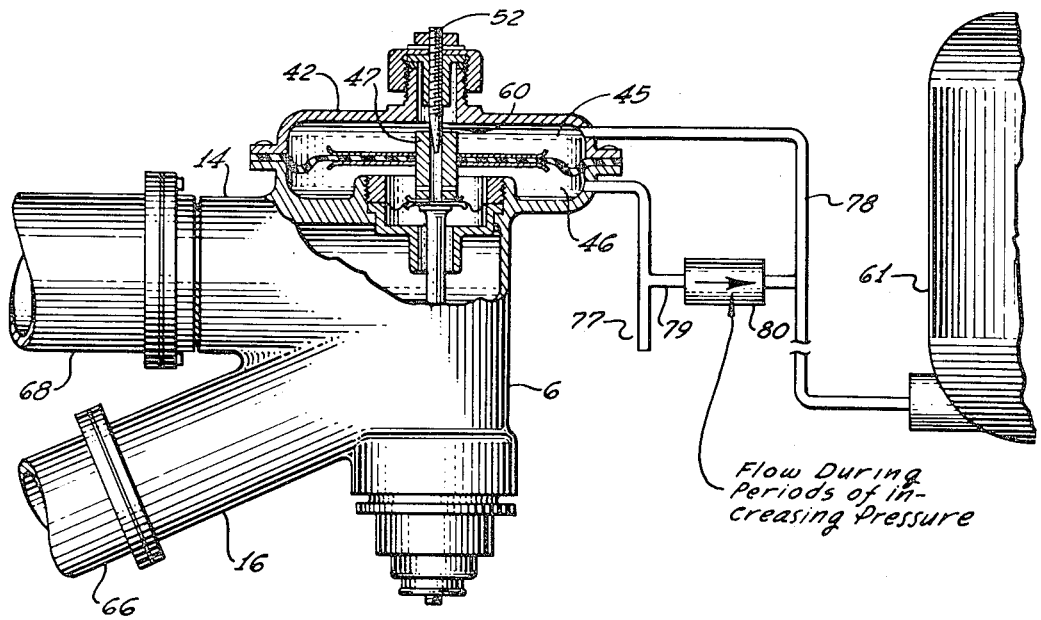

United States Patent Office 2,740,604
Patented Apr. 3, 1956

2,740,604

PRESSURE SENSITIVE FLOW REGULATOR

Robert W. Swigart, Long Beach, and Fredrick N. Sill, Hawthorne, Calif., assignors to Northrop Aircraft, Inc., Hawthorne, Calif., a corporation of California Application December 9, 1952, Serial No. 325,002

7 Claims. (Cl. 251—61)

This invention relates to a pressure sensitive gas flow regulator of general utility and more particularly to a dive-sensitive gas flow regulator associated with an airplane for controlling the quantity of an inert purging gas flowing to the plane's fuel cells.

It is highly desirable if not imperative that an inert purging gas occupy the vapor space of fuel cells associated with airplanes operating in military theatres of operation. The presence of an inert purging gas effectively prevents the formation of a gaseous explosive mixture in the vapor space of a fuel cell which may be ignited by combat fire, accidental sparking, etc. In this connection the U. S. A. F. specifications require that the ratio by weight of oxygen to the total gas present in a fuel cell does not exceed ten per cent at sea level, increasing to a maximum of eighteen per cent at 50,000 feet above sea level. An inert gas, for example nitrogen, may be used for this purpose, the gas being supplied from pressurized containers carried in the airplane, or air may be utilized from which the oxygen has been removed by the process of combustion.

Various methods have been utilized or suggested to maintain the proper amount of purging gas in airplane fuel cells. In thin walled bladder type cells of the type commonly used in military airplanes, the differential in pressure between the purging gas and ambient air should not exceed 7 p. s. i. or fall below 0 p. s. i., this difference being referred to throughout this application as the "allowable differential cell pressure."

One method presently utilized to maintain a desired quantity of purging gas in a fuel cell is known as the "constant bleed" method. In this method purging gas is supplied to the fuel cells of an airplane at a rate sufficient to maintain the "allowable differential cell pressure" within allowable limits during periods of maximum demand. At other times excess purging gas supplied to the fuel cells is vented to the atmosphere. In this method, whether purging gas is supplied from pressurized containers or by the combustion process, considerable purging gas is wasted and further bulky equipment is required which is objectional in airplane design from a space and weight standpoint. Another method suggested employs a purging gas pressure regulator and a pressure suction relief valve in the fuel vent outlet cooperating to maintain the proper allowable differential cell pressure. This system is objectional as a negative pressure may occur in the vent system during a dive, due to mal-functioning of the pressure suction relief valve, and resulting damage to the fuel cells.

Accordingly it is an object of the present invention to provide a gas flow regulator having a minimum of moving parts, therefore, it is economical to manufacture and maintain in proper operating condition.

Another object is to provide a gas flow regulator which is economical in operation in that the flow of gas through said regulator generally does not exceed the demand requirements of the apparatus or system with which the regulator is associated.

Another object is to provide a gas flow regulator in which the flow of gas through said regulator is responsive to changes in ambient fluid pressure.

Another object is to provide a dive-sensitive gas flow regulator for regulating the flow of an inert purging gas to the fuel cells of an airplane in which the flow of purging gas through the regulator is increased during periods in which the plane descends.

Another object is to provide an efficient and economical purging gas flow regulator especially adapted for use in connection with airplane fuel cell tanks.

The invention may be more fully understood by reference to the accompanying drawings, wherein:

Figure 3 is an elevational view of another embodiment of the gas flow regulator, parts being broken away to more clearly show the construction of the valve actuating structure.

Figure 1:
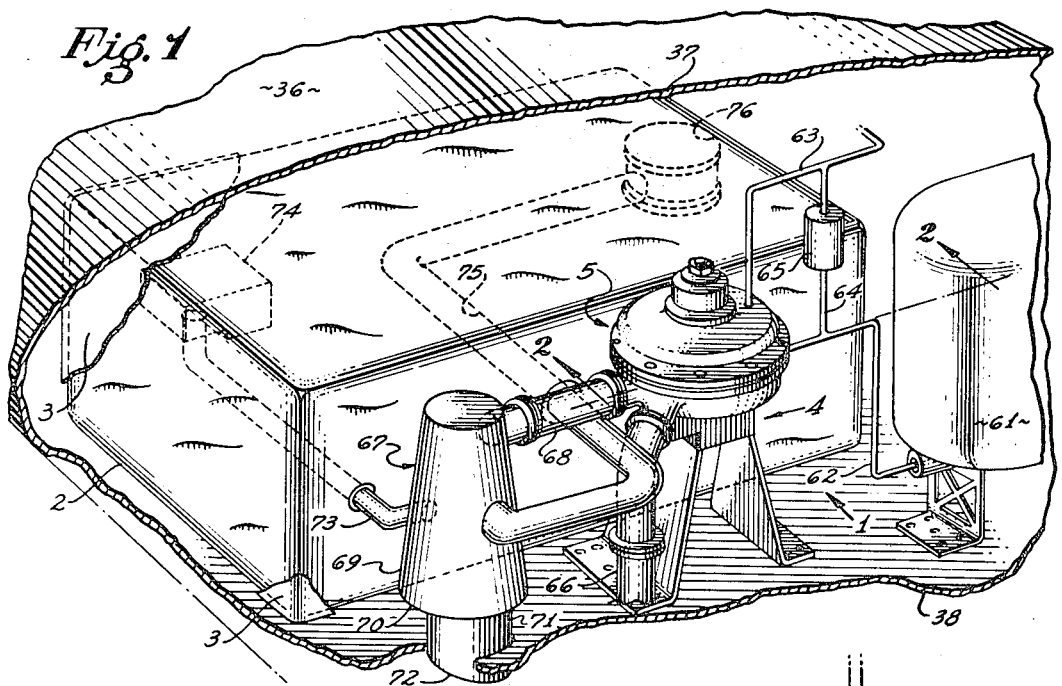
Figure 1 is a perspective view of one embodiment of a gas flow regulator as disclosed in the present invention, the regulator being illustrated as associated with a fuel cell positioned in the wing of an airplane.

Referring to Figure 1, the application of a gas flow regulator 1 is disclosed in connection with an airplane fuel cell in which it is utilized to regulate the flow of purging gas to said cell.

Figure 2:
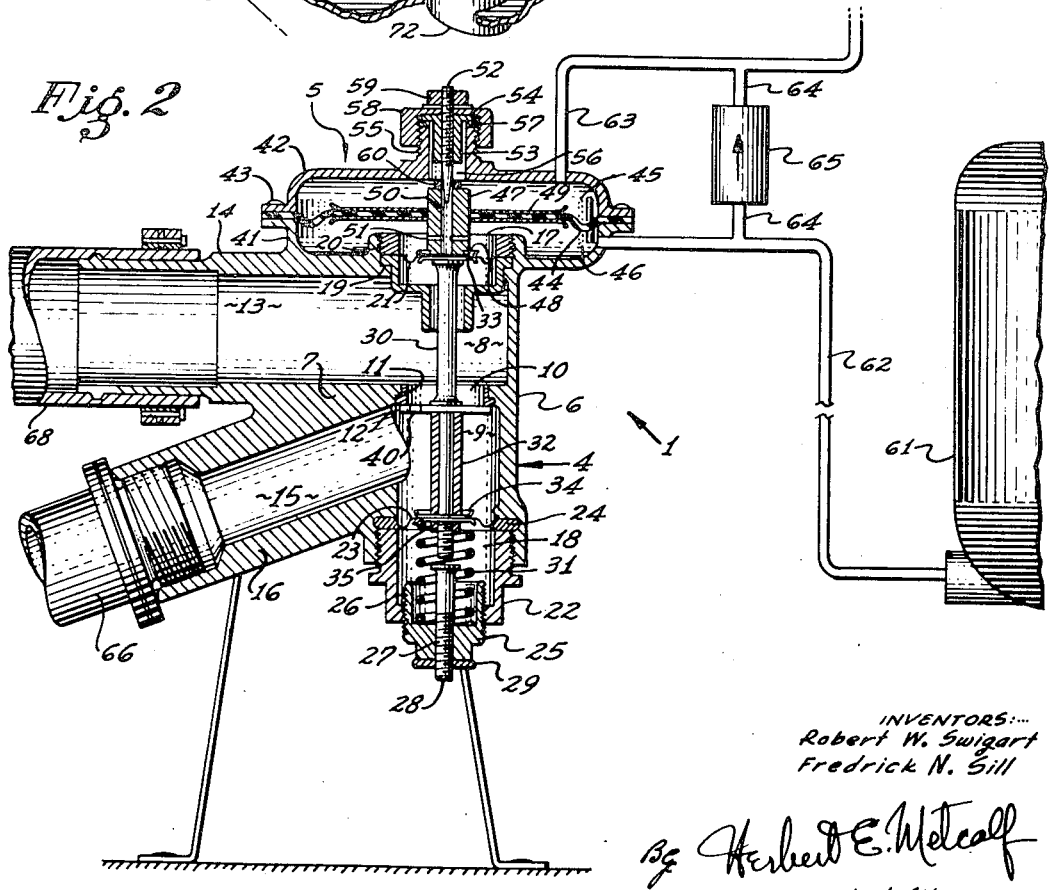
Figure 2 is a sectional view of the gas flow regulator of Figure 1 viewed from the line 2—2 thereof.

In the embodiment shown a thin walled bladder type fuel cell 2 is installed within a cell envelope 3. The fuel cell may be any one of a plurality of fuel cells comprising an airplane's fuel system while the envelope may be installed in a suitable cavity of the airplane or it may constitute a portion of the airplane's fixed structure. In Figure 1, the fuel cell and envelope are shown as being installed in an airplane wing 36 having upper and lower surfaces 37 and 38, respectively. The gas flow regulator 1, positioned adjacent a side wall of the envelope 3 in spaced relation thereto, may be considered as comprising a valve assembly 4 and a valve actuating assembly 5, the construction of preferred embodiments of the above assemblies, as shown in detail in Figures 2 and 3, follows.

The valve assembly comprises a casing 6 having a generally horizontal partition 7 dividing its interior into upper and lower chambers 8 and 9, respectively. The chambers communicate with each other through a circular aperture 10 in the partition 7, a valve insert 11 being positioned in said aperture to provide a suitable seat for a valve element 12 of the poppet type. A cylindrical bore 13 located in a projecting portion 14 of the casing and a similar bore 15 in an extending portion 16 communicate with the chambers 8 and 9, respectively. It is thus seen a course for fluid flowing through the casing is provided, fluid entering through inlet bore 15 and egresses therefrom through outlet bore 13.

The upper and lower walls of casing 6 are also provided with circular apertures 17 and 18, respectively, vertically aligned with aperture 10. The upper portion of aperture 17 is counterbored to provide an annular shoulder 19, the counterbored portion being threaded to receive a locking ring 20. A flexible diaphragm 21 is securely held between shoulder 19 and locking ring 20 thus rendering casing 16 fluid tight at this point. The outer portion of the lower aperture 18 is likewise counterbored and threaded to receive a supporting bushing 22, a flexible diaphragm 23 being positioned between the annular shoulder 24 and the end portion of bushing 22. A supporting element 25, having an annular upstanding wall portion 26 formed integral with its upper portion, is threadably secured in bushing 22.

A vertical threaded bore 27 extends through element 25, the axes of bore 27, apertures 10, 17 and 18 being coaxial. A stop element 28 extends through threaded bore 27, its upper end terminating below diaphragm 23 while a lock nut 29 threadably engages its lower end, thus permitting the stop element to be adjusted in a vertical direction. A valve stem 30 positioned coaxially of aperture 10, contacts diaphragm 21 and extends downwardly therefrom through aperture 10 and a central aperture in diaphragm 23 terminating in a threaded end portion a short distance below diaphragm 23. The valve element 12 is fixedly secured to the valve stem 30 and is normally urged into a closed position by a helical spring 31 in cooperation with valve stem 30. Sleeve element 32 surrounds a portion of the stem 30 maintaining the valve element in its proper relative position on the valve stem. A pressure disk 33, positioned between stem 30 and diaphragm 21, and a similar disk 34, positioned between sleeve 32 and diaphragm 23, provide suitable bearing surfaces for the valve stem and sleeve, respectively. A lock nut 35 threadably engages the end portion of valve stem 30, below diaphragm 23, fixedly securing the stem thereto in a manner which renders the casing fluid tight at this point. An orifice 40 in valve element 12 permits fluid flow through casing 6 with the valve element in its closed position for a purpose to be disclosed later.

The valve actuating assembly 5, as shown in the present disclosure, constitutes an annular upstanding wall 41 formed integral with casing 6. An inverted cup shaped element 42 is secured to wall 41 in flanged relationship by means of studs 43. A flexible diaphragm 44 secured between wall 41 and element 42 provides a pair of chambers 45 and 46. A cylindrical metering element 47 is located concentrically with and extends above and below diaphragm 44, its lower surface contacting a pressure disk 48 which in turn contacts the upper surface of diaphragm 21, its upper surface terminates in spaced relation with respect the top wall of element 42. Suitable support for metering element 47 with respect to diaphragm 44 is provided by two pressure disks 49 which are secured to said metering element and positioned on each side of the diaphragm. A metering orifice 50 extends coaxially of element 47 from its upper surface to a plurality of radially extending bores 51 located below diaphragm 44, the orifice and bores providing communication between chambers 45 and 46.

A tapered metering pin 52 is mounted from the top wall of element 42 in vertical alignment with orifice 50, the pin being adjustable in a vertical direction and so constructed that it may completely block or permit a varying fluid flow through the orifice. To adjustably mount pin 52 it is threadably retained in a cylindrical supporting member 53 which is provided with an annular shoulder 54. Member 53 is supported by its shoulder from a mounting boss 55, formed integral with the top wall of element 42. The body portion of member 53 depends into a concentric bore 56 in boss 55 which is coaxial with orifice 50. A conventional washer 57, retaining nut 58 and lock nut 59 completes the mounting for pin 52. The metering pin 52, at approximately the mid-point of its tapered portion, is provided with an enlarged portion 60. With diaphragm 44 and metering element 47 in their normal positions, that is when the pressure in chambers 45 and 46 are equal, the enlarged portion 60 contacts element 47 to effectively block fluid flow through orifice 50. As diaphragm 44 and element 47 are depressed the metering pin permits varying degrees of fluid flow through orifice 50 as described later.

Referring again to Figure 1, in which the regulator 1 is utilized to regulate the flow of purging gas to fuel cell 2, it is seen chamber 46 of the valve actuating device communicates with a fluid tight supplementary volume container 61 through a conduit 62. Chamber 45 communicates with ambient atmospheric air through a conduit 63, the latter conduit terminating adjacent a side wall of the fuselage so positioned that it is subject to static pressure. Conduits 62 and 63 are connected by a third conduit 64 in which a check valve 65 is positioned, the check valve permits fluid flow from conduit 62 to conduit 63 but effectively blocks flow in the reverse direction.

Inlet bore 15 of the valve casing communicates with a source of purging gas at super-atmospheric pressure by means of a conduit 66. The source of purging gas may constitute either an inert gas supplied from a pressurized container or ambient air from which the major portion of oxygen has been removed. The outlet bore 13 of the valve casing communicates with a mixing chamber 67 through a conduit 68. The mixing chamber is of generally conical configuration being defined by tapering side walls 69 joined at their base portions by a circular base plate 70, the structure defining chamber 67 is suitably positioned adjacent fuel cell 2 and regulator 1 with its base plate generally parallel with the lower surface 38 of wing 36. A conduit 71 extends from an aperture in base plate 70 through the wing's lower surface terminating a short distance below said surface. In as much as the conduit 71 is scarfed as indicated at 72 it provides an inlet to chamber 67 for ram air or a vent therefrom for purging gas and vaporized fuel as explained later.

A conduit 73, communicating with chamber 67 at approximately its mid-point, extends to a conventional climb valve 74 located in the upper forward end of the fuel cell. A similar conduit 75 extends between a mid-point of chamber 67 and a conventional dive valve 76 located in the upper aft portion of the cell. Both conduits 73 and 75 are in fluid tight relation with the side wall of cell 2 through which they pass. Valves 74 and 76 constitute no part of the present invention, accordingly they are not described in detail. It should be noted that conduit 68 communicates with chamber 67 at a point above the communicating points of conduits 73 and 75 with the chamber.

With the present apparatus thus generally described, the relation of the various parts will be made clearer by the following description of operation.

*Operation*

In considering the operation of the present apparatus it should be borne in mind that the fuel cell and gas flow regulator are associated with an airplane, therefore the fuel cell and regulator are subjected to decreasing or increasing atmospheric pressure as the plane ascends or descends. During periods of climb it becomes necessary to allow purging gas and fuel vapor to escape from fuel cell 2, while during periods of dive it is necessary to increase the flow of purging gas to the fuel cell if the allowable differential cell pressure is maintained. Accordingly provision is made in the present apparatus for the egress of excess fuel vapor and purging gas and also means for increasing the flow of purging gas during periods of maximum demand.

Prior to the flight of an airplane having fuel cells equipped with a purging gas flow regulator, as herein disclosed, certain adjustments are equipped when the regulator is first placed in service. First sufficient compressive stress is placed in spring 31 to urge valve element 12 into seating relationship with insert 11 and to maintain this relationship except during periods of descent at which time an additional supply of purging gas is required as presently described. Next stop element 28 is adjusted to provide the proper clearance between it and the lower end of valve stem 30, this clearance should be such that it will allow a sufficient flow of purging gas to the fuel cell during periods of maximum demand. Finally metering pin 52 is adjusted so its enlarged portion 60 seats on metering element 47 precluding fluid flow through orifice 50.

Purging gas may now be allowed to flow to the regulator. As valve element 12 is in its closed position all purging gas flowing to the fuel cell must pass through orifice 40 in the valve element 12, accordingly the orifice should be large enough to permit a sufficient flow of purging gas to fuel cell 2 during periods of normal purging gas requirements. During a climb the plane will ascend into regions of less dense atmosphere, the pressure of the ambient atmosphere will be less, accordingly air will flow from chambers 45, 46 and container 61 to the atmosphere via conduit 62, 63, and 64. During the period of evacuation of fluid from chamber 46 and container 61 a pressure drop occurs at check valve 65, it is thus seen that during periods of climb the fluid pressure in chamber 46 and container 61 is slightly in excess of ambient atmospheric pressure. Also during the climb period excessive vaporization of the fuel will occur, due to decreased atmospheric pressure, this vaporized fuel is free to flow from the fuel cell via climb valve 74, conduit 73, mixing chamber 67 and vent pipe 71. The vaporized fuel follows the above course due to the fact that the fluid pressure within the cell 2 exceeds the pressure of ambient air at this time.

During a dive the plane will descend into regions of more dense atmosphere, the pressure of the ambient atmosphere becoming greater. During this period vapor in cell 2 will condense and an additional supply of purging gas will be required to maintain a positive fluid pressure in the cell within the allowable limit and also to maintain a sufficient supply of inert purging gas therein. The purging gas flows through the conduit 68, mixing chamber 67, conduit 75, and dive valve 76. The purging gas follows this course due to the fact that the fluid pressure within the cell 2 is less than ambient air pressure at this time. Accordingly as the ambient atmospheric pressure increases air will flow to chamber 45 via conduit 63, the flow of air to chamber 46 and container 61 being blocked by check valve 65. As the fluid pressure in chamber 45 increases and reaches a pressure where it exceeds the force exerted by spring 31 valve element 12 is forced from its seat and allows an increased flow of purging gas to flow to the fuel cell. Should the plane make an extended dive at a maximum dive rate a maximum demand for purging gas will result, the increased fluid pressure in chamber 45 acting on diaphragm 44 will cause valve stem 30 to move its maximum distance, that is until it contacts stop 28 and a maximum quantity of purging gas will flow to cell 2.

During the above diving operation diaphragm 44 is deflected downwardly causing metering element 47 to move downwardly unseating portion 60 of the metering pin. This allows air to flow from chamber 45 to chamber 46 via orifice 50 and passageway 51 and also to container 61 via conduit 62. This combination of air flowing through a variable orifice to a supplementary volume chamber where a pressure is gradually built up provides means which are ideal for controlling the quantity of purging gas flowing to the fuel cell during periods of descent, when this relationship is plotted (quantity of purging gas in lbs. per minute versus rate of descent or rate of pressure change) an ideal flow curve for purging gas results. Air flowing from chamber 46 exhausting into supplementary volume container 61 has a further advantage as it permits the use of a tapered pin and orifice large enough to be practical. If a supplementary volume container was not used, that is the air allowed to exhaust from chamber 45 to chamber 46 with no further space for expansion, orifice 50 and metering pin 52 would necessarily be small and the desired flow of purging gas during periods of descent would be difficult if not impossible to attain. The fluid pressures in chambers 45, 46 and container 61 become approximately equal shortly after the plane reaches the bottom of its dive at which time spring 31 returns valve element 12 to its seat and a normal supply of purging gas is again supplied to the fuel cell via orifice 40. It should be noted that fluid pressure in supplementary volume container 61 lags ambient atmospheric pressure slightly at all times, that is it slightly exceeds ambient atmospheric pressure during periods of climb and is slightly less during a dive.

Although the above disclosure relates to a gas flow regulator in which a greater quantity of fluid flows therethrough during periods of increasing ambient atmospheric pressure it should be understood that conduct 63 may communicate with a confined body of gas subject to varying pressure. Such a regulator may be utilized in any installation where an increased flow of one gas is desired concurrently as another gas increases in pressure.

Also small changes may be made in the valve actuating assembly whereby a greater quantity of fluid may flow through said regulator during periods of decreasing ambient fluid pressure or of a confined body of gas and will have utility in various industrial installations. In such an embodiment the valve assembly is identical with that shown in Figure 2, accordingly only the valve actuating assembly and conduits connecting it with the supplementary volume container are shown in detail in Figure 3. In this instance chamber 46 is vented to ambient fluid through a conduit 77 while chamber 45 communicates with the supplementary volume container through a conduit 78. Conduits 77 and 78 are interconnected by a third conduit 79 in which there is a check valve 80.

In the latter embodiment during periods in which the ambient fluid pressure in chamber 46 plus the force exerted by spring 31 acts to maintain the metering element 47 and portion 60 of metering pin 52 in seating relationship thereby precluding the flow of fluid through orifice 50. During this period fluid will also flow to container 61 via conduits 77, 78 and 79, check valve 80 permitting fluid flow from conduit 77 to conduit 78 but not in the reverse direction. As pressure of the ambient fluid decreases, pressure in chamber 46 also decreases, resulting in a difference in pressure acting on the two sides of diaphragm 44, when this difference in pressure exceeds the force exerted by spring 31 valve element 12 is moved from its seat and an additional quantity of gas flows through the regulator. This embodiment, utilizing a variable orifice and an additional volume of air to supplement that contained in chamber 45, results in the same advantages as pointed out in connection with the embodiment shown in Figure 2.

Although one of the embodiments described above is disclosed as regulating the flow of purging gas to a fuel cell of an airplane it is to be understood that both of the regulators may be used for numerous other purposes and that changes may be made in the construction and arrangement of elements without departing from the spirit or scope of the invention. For example the metering element 47 and pin 52 need not be positioned concentrically with respect to diaphragm 44 but may be positioned outside its periphery. Also supplementary volume container 61 is not essential to the operation of the regulator, however, in airplane structures it is advantageous as it can be located at a position remote from the regulator. If a supplementary volume container is not utilized the volume of chamber 46 (Fig. 2) would necessarily be larger than that of chamber 45, while in the embodiment shown in Figure 3 the volume of chamber 45 would be larger than chamber 46.

While in order to comply with the statutes, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A fluid flow regulator comprising a casing having a fluid inlet and outlet, a valve element resiliently mounted to regulate fluid flow through said casing, a diaphragm having an aperture therein mounted in a compartment associated with said casing dividing said compartment into first and second sub-compartments, said first sub-compartment being vented to a fluid subject to varying pressure, means permitting unidirectional fluid flow only between said second sub-compartment and said fluid subject to varying pressure, said diaphragm assuming a normal position at such times as the fluid pressure in said sub-compartments is equal and deflecting to a non-normal position at such times as the fluid pressure in one of said sub-compartments exceeds the fluid pressure in the other of said sub-compartments, means cooperating with said diaphragm to close said aperture when said diaphragm assumes said normal position and to allow a metered fluid flow between said sub-compartments when said diaphragm is deflected to said non-normal position, said diaphragm also cooperating with said valve element to restrict fluid flow through said casing when said diaphragm assumes said normal position and to permit additional fluid flow through said casing when said diaphragm is deflected to said non-normal position.

2. A fluid flow regulator as set forth in claim 1, in which said means permitting unidirectional fluid flow only between said second sub-compartment and said fluid subject to varying pressure permits flow only during periods in which the pressure of said fluid subject to varying pressure is increasing.

3. A fluid flow regulator as set forth in claim 1, in which said means permitting unidirectional fluid flow only between said second sub-compartment and said fluid subject to varying pressure permits flow only during periods in which the pressure of said fluid subject to varying pressure is decreasing.

4. A fluid flow regulator as set forth in claim 1, further characterized by said second sub-compartment also being in fluid communication with a body of confined fluid the pressure of which varies according to but lags the pressure of said fluid subject to varying pressure.

5. In a purging system for aircraft fuel cells a gas flow regulator for controlling the flow of an inert gas to said fuel cells comprising: a casing having a fluid inlet and outlet, said inlet adapted to communicate with a source of inert purging gas, said outlet adapted to communicate with the vapor space of said fuel cells, a valve element resiliently mounted to regulate the flow of said purging gas through said casing, a diaphragm having an aperture therein mounted in a compartment associated with said casing dividing said compartment into first and second sub-compartments, said first sub-compartment being vented to ambient atmosphere, means permitting unidirectional fluid flow only between said second sub-compartment and said ambient atmosphere, said diaphragm assuming a normal position at such times as the fluid pressure in said sub-compartments is equal and deflecting to a non-normal position at such times as the fluid pressure in one of said sub-compartments exceeds the fluid pressure in the other of said sub-compartments, means cooperating with said diaphragm to close said aperture when said diaphragm assumes said normal position and to allow a metered fluid flow between said sub-compartments when said diaphragm is deflected to said non-normal position, said diaphragm also cooperating with said valve element to restrict the flow of purging gas through said casing when said diaphragm assumes said normal position and to permit additional fluid flow through said casing when said diaphragm is deflected to said non-normal position.

6. In a purging system as set forth in claim 5, in which said means permitting unidirectional fluid flow only between said second sub-compartment and said ambient atmosphere permits flow only during periods in which the pressure of said ambient atmosphere is decreasing.

7. In a purging system as set forth in claim 5, further characterized by said second sub-compartment also being in fluid communication with a body of confined fluid the pressure of which varies according to but lags the pressure of said ambient atmosphere.

References Cited in the file of this patent

UNITED STATES PATENTS

| | | |
|---|---|---|
| 2,176,807 | Wunsch | Oct. 17, 1939 |
| 2,365,650 | Shaw et al. | Dec. 19, 1944 |
| 2,620,719 | Price | Dec. 9, 1952 |